(No Model.)
J. H. KELLOGG.
PROCESS OF PREPARING NUTMEAL.
No. 580,787. Patented Apr. 13, 1897.
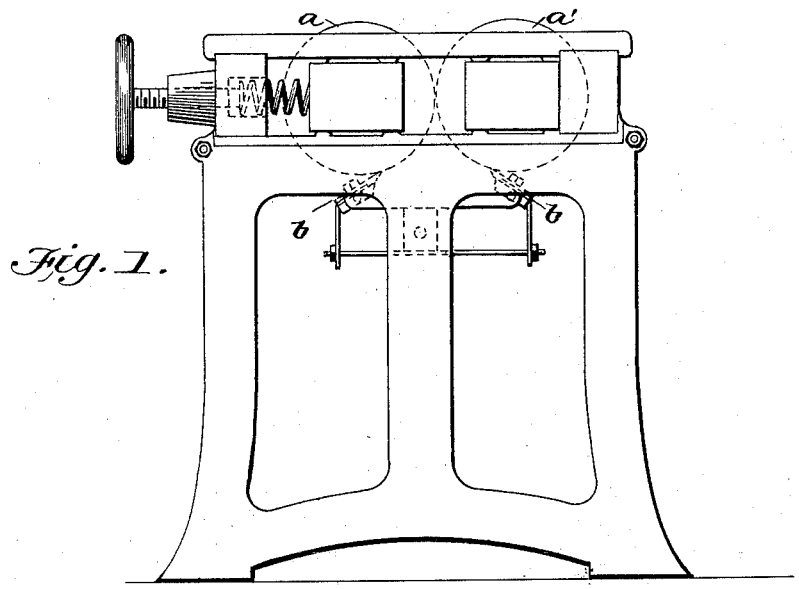
Fig. 1.
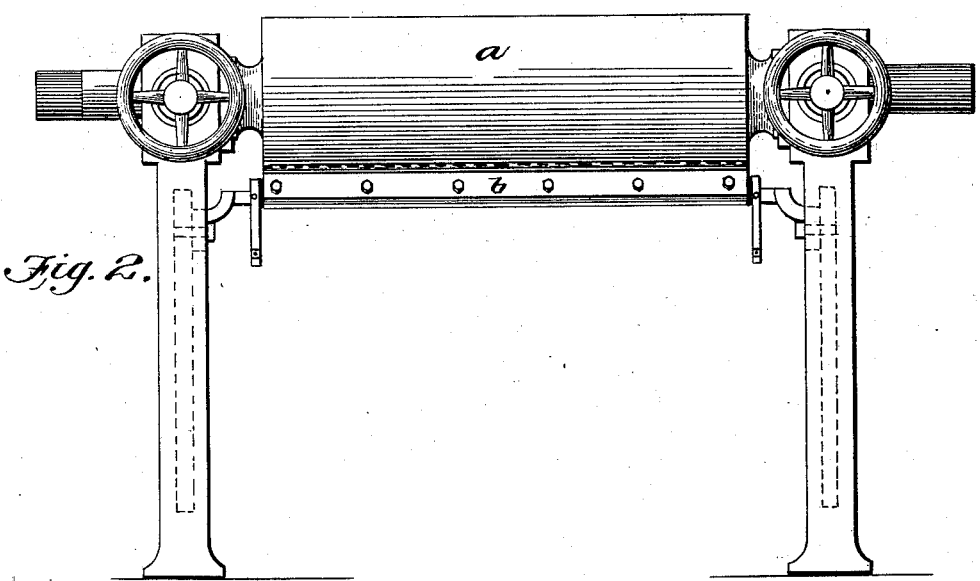
Fig. 2.
Fig. 3.
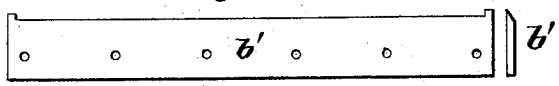
WITNESSES:
M. D. Blondell
Amos W. Hart
INVENTOR
John H. Kellogg.
BY Munn & Co.
ATTORNEYS.

UNITED STATES PATENT OFFICE.

JOHN H. KELLOGG, OF BATTLE CREEK, MICHIGAN.

PROCESS OF PREPARING NUTMEAL.

SPECIFICATION forming part of Letters Patent No. 580,787, dated April 13, 1897.

Application filed November 4, 1895. Serial No. 567,949. (No specimens.)

*To all whom it may concern:*

Be it known that I, JOHN H. KELLOGG, of Battle Creek, in the county of Calhoun and State of Michigan, have invented a new and useful Process of Manufacturing an Improved Alimentary Nut Product, of which the following is a specification.

It is the object of my invention to produce an improved alimentary product or products from peanuts or other nuts. To this end I subject the nut-kernels to the process hereinafter described, whereby I obtain a bifold or double product, namely, a dry and practically white nutmeal and a pasty adhesive substance that is for convenience of distinction termed "nut-butter."

In the accompanying drawings, Figure 1 is a side view of an apparatus which I employ in carrying out my process. Fig. 2 is an end view of the same. Fig. 3 is a side and end view of the knives or scrapers forming part of the apparatus.

The first step of the process is the removal of the skin of the nut-kernels, which is effected by any of the ordinary methods of blanching. Thus they may be soaked in cold or warm water for a short time and then passed through an ordinary blanching machine. The next and relatively most important step consists in thoroughly cooking the blanched kernels, which fixes the oil and hydrates the starch. This cooking is best effected by boiling in water until the kernels are reduced to a perfectly soft condition. In carrying out this part of the process I place the kernels, along with a sufficient quantity of water, in covered crocks or earthenware vessels, which are then set in an oven heated to the requisite degree, and are kept therein for several hours, usually four to six, the time being varied according to the quality and condition of the nuts.

When the cooking operation is completed, the fluid remaining in the crocks is drawn or poured off, and since this contains a little oil and some elements that are soluble in water it is a medium for elimination of the strong characteristic flavor of the peanut. In some cases the fluid is thus drawn off and fresh water supplied one or more times while the cooking is in progress, for the purpose of more completely eliminating the objectionable acrid elements, but care must be taken that this part of the process is not carried too far, since the product thereby loses something of its sweetness, besides becoming too dry and lacking flavor. The cooked kernels are then shredded. One way of carrying out this part of the process is to treat the product as practiced in manufacturing vermicelli—that is to say, by passing them through a colander or sieve.

Thirdly, the shredded product is thoroughly dried in any practical way with a moderate heat.

The fourth step consists in passing the dried product between rotating rolls or rollers set so close to each other that it is subjected to heavy pressure, with the result that the pasty mass is separated into two quite distinct forms, which are removed from the respective rolls by scraping-knives and delivered into separate receptacles. One of such products is dry and granulated, thus having the appearance of a meal that is nearly white in color and whose contained oil is for the most part emulsified, while the other product is moist instead of being comparatively dry, and also darker in color, since it holds a relatively large amount of free oil and probably also some adhesive substances. It also evidently contains an emulsifying principle, since when the free oil is thoroughly incorporated with the solid substance it mixes readily with water, forming a milky liquid.

In further explanation of the separation and division of the dried product from the moist or wet one by pressure, as stated, I will add that the result—to wit, the definite separation—was a surprise and discovery, for it was to be naturally anticipated that the product of the pressing operation would be a homogeneous solid, together with some free oil. In practice, however, the practically dry and white mealy portion separates on and is removed from one of the pair of rolls and the other moist and colored portion adheres to and is taken off from the opposite roll. It has been found that this separation of products—the dry from the moist—depends upon or is caused by the different adjustments of the knives or scrapers relative to the rolls. That is to say, by adjusting the knife or scraper of one roll, so that it is closer to the latter than the other scraper is to the adjacent roll the product which comes off from it will be dry, while from the roll having the closely-adjusted scraper will come off the free oil, &c.

In the accompanying drawings, $a$ indicates the roll from which the dry product or "meal" is taken, and $a'$ the roll from which the more oily product is taken. The scraper $b$ of roll $a$ is in contact with it, while the scraper $b'$ of the other roll $a'$ is so held as to leave a very narrow space between it and the roll. I prefer to provide the said scraper $b'$ (see Fig. 3) with offsets or shoulders at its ends, which shoulders rest on the surface of the roll $a'$ and thus hold the body of the scraper $b'$ slightly removed from the roll. Thus, practically, it is merely a difference in adjustment of the scrapers that produces the difference in the products obtained.

The dry product or "nutmeal," as it is designated, is a very palatable and nutritious substance and readily assimilated by persons of weak digestion, since the starch and fat which it contains with other elements are, to use a convenient if inexact phrase, in a partially-predigested state. The nutmeal is practically as dry as table-salt in its usual condition, and hence does not pack, but may be poured into and out of cans, bottles, or other like receptacles with great facility.

The moist and brown product is soft and pasty like butter and is necessarily somewhat less easily digestible than the meal, owing to the greater amount of free oil it contains. It is used as a substitute for butter, either for table use or for shortening in cooking. It is in fact a good substitute for animal fats. It has a slight nutty flavor and is palatably agreeable, besides being far more nutritious than butter.

Having thus described my invention, what I claim, and desire to secure by Letters Patent, is—

1. The improved process of producing the alimentary nut product specified, which consists, in blanching the nut-kernels; then boiling the same for several hours, till they are thoroughly cooked and rendered soft and pulpy; next, drying such cooked products; and, lastly, subjecting the dried product to heavy pressure between rollers and separating the fine meal from the roller to which it adheres, as specified.

2. The process of producing the improved alimentary nut product, consisting in removing the cuticle of the nut-kernels; then boiling them in water until thoroughly cooked and rendered soft; next shredding and drying the cooked product; and, lastly, passing the dried substance between rotating rollers by which it is subjected to heavy pressure, and the fine meal is separated from the roller to which it adheres, and the more oily portion from the adjacent roller, as specified.

JOHN H. KELLOGG.

Witnesses:
NEWTON K. SHELDEN,
WILL. K. KELLOGG.